US009929471B2

(12) United States Patent
Fonseca

(10) Patent No.: US 9,929,471 B2
(45) Date of Patent: Mar. 27, 2018

(54) VERY COMPACT TM01 MODE EXTRACTOR

(71) Applicant: EUROPEAN SPACE AGENCY, Paris (FR)

(72) Inventor: Nelson Fonseca, Noordwijk (NL)

(73) Assignee: EUROPEAN SPACE AGENCY, Paris (FR)

( * ) Notice: Subject to any disclaimer, the term of this patent is extended or adjusted under 35 U.S.C. 154(b) by 41 days.

(21) Appl. No.: 15/029,838

(22) PCT Filed: Oct. 21, 2013

(86) PCT No.: PCT/EP2013/071973
§ 371 (c)(1),
(2) Date: Apr. 15, 2016

(87) PCT Pub. No.: WO2015/058784
PCT Pub. Date: Apr. 30, 2015

(65) Prior Publication Data
US 2016/0248164 A1     Aug. 25, 2016

(51) Int. Cl.
*H01P 5/12*     (2006.01)
*H01Q 13/02*     (2006.01)
(Continued)

(52) U.S. Cl.
CPC ........... *H01Q 13/02* (2013.01); *G01S 7/4026* (2013.01); *G01S 13/4409* (2013.01); *H01P 1/16* (2013.01);
(Continued)

(58) Field of Classification Search
CPC . H01Q 13/02; H01P 1/16; H01P 1/161; H01P 5/08; H01P 5/19; H01P 5/103; G01S 7/4026; G01S 13/4409
See application file for complete search history.

(56) References Cited

U.S. PATENT DOCUMENTS

| 3,731,236 A | 5/1973 | Di Tullio et al. |
| 4,322,731 A | 3/1982 | Drabowitch |
| 2009/0295661 A1* | 12/2009 | Tzelepis ................ G01S 3/14 343/786 |

FOREIGN PATENT DOCUMENTS

JP     S56-104201 U     8/1981

OTHER PUBLICATIONS

Apr. 26, 2016 International Preliminary Report on Patentability issued in International Patent Application No. PCT/EP2013/071973.

(Continued)

*Primary Examiner* — Robert J Pascal
*Assistant Examiner* — Kimberly Glenn
(74) *Attorney, Agent, or Firm* — Oliff PLC

(57) ABSTRACT

A mode extractor for extracting TM01 mode from an electromagnetic signal, including a first and second turnstile junction, each of the turnstile junctions having first port, four second ports of rectangular waveguide which are mutually orthogonal and orthogonal to first port and matching section provided at least partially in center region of respective turnstile junction, center region being located at intersection of first port and four second ports wherein first and second turnstile junction are arranged so that longitudinal axes of their first ports are aligned with each other and their first ports are facing in opposite directions, each of the second ports of first turnstile junction is electromagnetically coupled to corresponding one of second ports of second turnstile junction, and a coaxial coupling device is inserted into matching section of first turnstile junction so that a portion of coaxial coupling device extends into first port of first turnstile junction.

16 Claims, 10 Drawing Sheets

(51) Int. Cl.
  G01S 7/40    (2006.01)
  G01S 13/44   (2006.01)
  H01P 1/161   (2006.01)
  H01P 1/16    (2006.01)
  H01P 5/08    (2006.01)
  H01P 5/19    (2006.01)
  H01P 5/103   (2006.01)

(52) U.S. Cl.
  CPC .............. H01P 1/161 (2013.01); H01P 5/08 (2013.01); H01P 5/19 (2013.01); H01P 5/103 (2013.01)

(56) References Cited

OTHER PUBLICATIONS

Aug. 7, 2014 International Search Report issued in International Patent Application No. PCT/EP2013/071973.

Lotfollah Shafai et al; "Multiple phase center performance of reflector antennas using a dual mode horn;" IEEE Transactions on Antennas and Propagation; Nov. 2006; vol. 54; No. 11; pp. 3407-3417.

Enrico Reiche et al; "A dual circular combined K/Ka-band RF sensing feed chain for multi beam satellite antennas;" European Conference on Antennas and Propagation (EuCAP); 2011; pp. 3198-3202.

E. Amyotte et al; "High performance communications and tracking multi-beam antennas;" European Conference on Antennas and Propagation (EuCAP); Nov. 2006; pp. 1-8.

P. Lepeltier et al; "Thales alenia space france antennas: recent achievements and future trends for telecommunications;" European Conference on Antennas and Propagation (EuCAP); 2007; pp. 1-5.

J.C. Lafond et al; "Thales alenia space france antennas: recent achievements for telecommunications;" European Conference on Antennas and Propagation (EuCAP); 2011; pp. 3193-3197.

* cited by examiner

VERY COMPACT TM01 MODE EXTRACTOR

TECHNICAL FIELD OF THE INVENTION

The present invention relates to a waveguide mode extractor for extracting a higher-order mode, such as the TM01 ($TM_{01}$) mode, from an incoming electromagnetic signal.

The invention is particularly though not exclusively applicable to feed chains of microwave antennas; such as satellite antennas, and especially to feed chains including a Radio-Frequency Sensing (RFS) system.

BACKGROUND OF THE INVENTION

Feed chains are strategic components for satellite antennas. The current trend in communication satellites is toward multiple beam coverage, requiring more and more feed chains per satellite. This is particularly true for broadband applications at Ka-band, with current antenna designs having about 20 user-link dual-band (transmit and receive) feed chains per reflector in a single-feed-per-beam antenna configuration, and this number is expected to grow by at least a factor of two in the coming decade. This also means that the beam width has to become smaller. Current values of the beam width are in the range of 0.5 to 0.8 degrees and are expected to go down to a beam width of about 0.2 degrees.

In view of this trend, RFS systems used to improve beam pointing accuracy are of particular importance. One key component of RFS systems is the mode extractor at feed chain level, since the use of higher-order modes, such as the TM01 and TE21 ($TE_{21}$) modes, enables refined pointing performance. These modes provide radiation patterns with a null on-axis, referred to as a "difference pattern" as illustrated in FIG. 1, in which the abscissa indicates an angle of observation in degrees at the location of the RFS system, and the ordinate indicates a signal strength in dB. In the figure, an example of the difference pattern 102 is represented by the dashed line, while an example of a "sum pattern" 101, typically produced by the fundamental modes TE11 ($TE_{11}$), is represented by the solid line. The difference pattern enables more accurate pointing than the sum pattern. The RFS port extracts a signal from a beacon station that is usually located within the coverage in order to enable accurate beam pointing. However, this requires that at least one of the user-link feed chains per reflector antenna comprises a mode extractor for RFS purposes, i.e. a mode extractor capable of extracting a higher-order mode having a difference pattern.

In order to keep the feed cluster volume as small as possible, a very compact mode extractor for the RFS system is required. On the other hand, the mode extractor should also be compatible with a generic design for the user-link feed chain so that the mode extractor may be employed in different feed chains without having to adapt or customize the respective feed chain to the mode extractor beforehand.

In the prior art two main groups of configurations for feed chains in RFS systems, or more generally, feed chains comprising a mode extractor are known. The first group of configurations is based on the extraction of the TE21 mode with a mode extractor 201 arranged in between the antenna horn 203 and the user-link feed chain 202, as schematically illustrated in FIG. 2. This approach enables to use a generic feed chain design for the user-link, provided that the TE21 mode extractor 201 is designed so as to have limited impact on the fundamental modes over the two operating frequency bands (transmit and receive). An example of implementation is described in P. Lepeltier et al., "Thales Alenia Space France antennas: recent achievements and future trends for telecommunications", in proceedings of the 2nd European Conference on Antennas and Propagation (EuCAP), pp. 1-5, 2007. According to this implementation, a coupling device is used to extract the TE21 mode. However, this requires a long coupling section and a specific combination network. In consequence, the mode extractor according to this implementation is ab aft the same size as a complete transmit/receive user-link feed chain.

J. C. Lafond et al., "Thales Alenia Space France antennas: recent achievements for telecommunications", in proceedings of the 5th European Conference on Antennas and Propagation (EuCAP), pp. 3193-3197, 2011, illustrates the current trend to reduce feed chain length and diameter. A significant improvement is demonstrated for the user-link feed chain, the length of which is reduced by a factor of two. Naturally, this calls for at least a similar size reduction on the higher-order mode extractor.

The second group of configurations is based on the extraction of the TM01 mode with a mode extractor 301 arranged after the user-link feed chain 302 which is coupled to the antenna horn 303, as schematically illustrated in FIG. 3. An example of implementation is described in E. Amyotte et al., "High performance communications and tracking multi-beam antennas", in proceedings of the 1st European Conference on Antennas and Propagation (EuCAP), 2006. This configuration enables the design of a very compact mode extractor. However, the main drawback is that a specific user-link feed chain design is required, i.e. a user-link feed chain design specifically adapted to the mode extractor 301. In particular, the receive section of the feed chain needs to be modified so as to propagate the required higher-order mode(s), and the septum polarizer, which is usually implemented in the receive chain for reasons of simplicity and compactness, has to be replaced by an orthomode junction (OMJ) associated with a specific combination network. In addition, in this implementation a mode filter is also required, resulting in a more complex feed chain design which is significantly different from the typical user-link only feed chain design. Thus, this approach requires a specific development for the feed chain including RFS, resulting in additional development costs.

The second group of configurations also includes those aiming at extraction of both the TM01 and TE21 modes. An example of implementation is provided in E. Reiche et al., "A dual circular combined K/Ka-band RF sensing feed chain for multi beam satellite antennas", in proceedings of the 5th European Conference on Antennas and propagation (EuCAP), pp. 3198-3202, 2011. This approach still requires a specific user-link feed chain development with the additional design constraint that the TE21 mode also has to propagate in the receive part of the feed. This tends to degrade performance in comparison to a user-link only design, affecting in particular the transmit-to-receive rejection in the receive band which is typically obtained using below cut-off waveguide cross-section filtering.

Summarizing, current implementations of mode extractors are either bulky or require custom feed chain design. In addition, the implementations known in the art tend to have good extraction of the respective higher-order mode only over a limited frequency range, thus requiring the design to be tuned to a given beacon frequency.

SUMMARY OF THE INVENTION

It is an object of the present invention to overcome the limitations of the prior art discussed above. It is another object of the invention to provide a compact mode extractor for extracting higher-order modes from an electromagnetic signal (higher-order mode extractor). It is yet another object of the invention to provide a higher-order mode extractor compatible with generic user-link feed chains. It is yet another object of the invention to provide a broadband higher-order mode extractor.

In view of the above objects, a mode extractor having the features of claim 1 is proposed. Preferred embodiments of the invention are described in the dependent claims.

According to an aspect of the invention, a mode extractor for extracting a TM01 mode from an (incoming) electromagnetic signal comprises a first turnstile junction and a second turnstile junction, each of the turnstile junctions having a first port, four second ports of rectangular waveguide which are mutually orthogonal and orthogonal to the first port, and a matching section provided at least partially in a center region of the respective turnstile junction, the center region being located at an intersection of the first port and the four second ports, wherein the first turnstile junction and the second turnstile junction are arranged so that longitudinal axes of their first ports are aligned with each other and their first ports are facing in opposite directions, each of the second ports of the first turnstile junction is electromagnetically coupled to a corresponding one of the second ports of the second turnstile junction, and a coaxial coupling device is inserted into the matching section of the first turnstile junction so that a portion of the coaxial coupling device extends into the first port of the first turnstile junction.

By the above configuration, which employs two back-to-back turnstile junctions, i.e. two turnstile junctions which are arranged back to back and coupled through their respective ports of rectangular waveguide, the present invention provides a very compact higher-order mode extractor. It is found that a higher-order mode extractor according to the present invention fits in a cylinder of 32 mm in diameter and 23 mm in height when it is adapted to cover the standard Ka-band allocated to broadband satellite communications, i.e. 17.7-20.2 GHz in transmit and 27.5-30.0 GHz in receive for the space segment. This is about ten times shorter than a standard TE21 mode extractor compatible with a generic user-link feed chain design. Also, the diameter, which is less than two wavelengths at the lowest frequency, is compatible with very compact next-generation user-link feed chain designs. Such a compact design enables to save both cost for material and mass, especially the latter advantage being very important for applications aboard satellites and other space applications.

Further, arranging the coaxial coupling device so as to extend through the matching section into the first port (common port) of the first turnstile junction allows to achieve good matching between the coaxial coupling device and the TM01 mode of the electromagnetic signal, so that the TM01 mode can be extracted with low insertion losses.

On the other hand, the fundamental modes of the electromagnetic signal from which the higher-order mode is extracted are not affected by the mode extraction according to the above configuration, so that the inventive higher-order mode extractor can be said to act as a through for the fundamental modes. This statement is applicable to both the receive (Rx) band and the transmit (Tx) band in commonly used microwave communication bands, such as the Ka-, Ku- and C-bands.

Since the fundamental modes are not affected, the present invention can be considered as belonging to the first group of configurations. Accordingly, the inventive higher-order mode extractor can be used in between the horn and the user-link feed chain of an antenna assembly (feed chain assembly) without necessitating a dedicated design of the user-link feed chain. In other words, the present invention, even if used in between the horn and the user-link feed chain of the antenna assembly, is compatible with a generic user-link feed chain design. Thus, since the inventive higher-order mode extractor is compatible with generic user-link feed chains, it helps to save development costs for user-link feed chains.

Summarizing, the present invention combines the advantages of the two groups of configurations described above while avoiding their respective drawbacks.

The second ports of the first turnstile junction may be electromagnetically coupled to the corresponding second ports of the second turnstile junction by intermediate sections of rectangular waveguide that extend in parallel to the longitudinal axis of the first port of the first turnstile junction.

A particular advantage is achieved if each of the intermediate sections of rectangular waveguide has a first step portion at its one end and a second step portion at its other end, the first and second step portions each reducing a respective cross-section of the intermediate section of rectangular waveguide.

By this configuration, the impact of the mode extractor on the fundamental modes can be reduced without affecting the higher-order mode extraction. Additional steps may be added to further improve the matching of the fundamental modes, but also result in a more complex design.

Preferably, the rectangular waveguides of the second ports of the first and second turnstile junctions have a cross-section aspect ratio of less than 1:2. Further preferably, the rectangular waveguides of the second ports of the first and second turnstile junctions have a cross-section aspect ratio between $(1:4-x/2)$ and $(1:4+x/2)$, with $x \leq 0.4$.

Here, the cross-section aspect ratio of a rectangular waveguide is understood to indicate the ratio of the length b of the narrow sides (i.e. short sides) of the transverse cross-section of the rectangular waveguide and the length a of the broad sides (long sides) of the transverse cross-section of the rectangular waveguide, i.e. the cross-section aspect ratio is given by b:a, wherein the transverse cross-section is the cross-section perpendicular to a guide direction (i.e. longitudinal direction) of the rectangular waveguide.

Conventionally, rectangular waveguides are designed to have a cross-section aspect ratio of 1:2. By the above design of the second ports of the first and second turnstile junctions, respectively, which deviates from the conventional design, an improved matching of the TM01 mode to the coaxial coupling device is achieved. On the other hand, the fundamental modes of the electromagnetic signal are hardly affected by this measure.

A further advantage is achieved if the first port of the first turnstile junction has a constricted portion which surrounds the portion of the coaxial coupling device that extends into the first port of the first turnstile junction, and which has a smaller cross-sectional area than the first port of the second turnstile junction. Further, the first port of the first turnstile junction may have a dilated portion which is located between the constricted portion and the center region of the first turnstile junction and which has a larger cross-section than the first port of the second turnstile junction.

Thereby, the matching between the coaxial coupling device and the TM01 mode can be further increased without significantly affecting the fundamental modes.

Preferably, the matching section of the first turnstile junction is symmetric about the longitudinal axis of the first port of the first turnstile junction, the coaxial coupling device is inserted into the matching section of the first turnstile junction through a back wall of the first turnstile junction, which is located on a far side (of the first turnstile junction) from the first port of the first turnstile junction, and extends through the matching section of the first turnstile junction along a center line of the matching section into the first port of the first turnstile junction.

The matching section of the first turnstile junction may comprise one or more matching parts which are concentric to each other, and each of which is a metallic cylinder, cuboid, or frustum, wherein the one or more matching parts are arranged so as to be symmetric about the longitudinal axis of the first port of the first turnstile junction, and at least one of the one or more matching parts protrudes into the first port of the first turnstile junction, and the coaxial coupling device extends through the one or more matching parts along their center axes into the first port of the first turnstile junction.

The matching section of the first turnstile junction may comprise first and second matching parts which are concentric to each other, and each of which is a metallic cylinder, cuboid, or frustum, wherein the first and second matching parts are arranged so as to be symmetric about the longitudinal axis of the first port of the first turnstile junction, and at least one of the first and second matching parts protrudes into the first port of the first turnstile junction, and the coaxial coupling device extends through the first and second matching parts along their center axes into the first port of the first turnstile junction. Additional matching parts may improve the matching of the fundamental modes at the expense of a more complex design.

Further, the coaxial coupling device may be coupled into a rectangular waveguide or to a coaxial cable arranged between the back wall of the first turnstile junction and a back wall of the second turnstile junction, the back wall of the second turnstile junction being located on a far side (of the second turnstile junction) from the first port of the second turnstile junction. Preferably, the coaxial coupling device is a coupling stub or a pin of a coaxial line.

Further preferably, the first ports of the first and second turnstile junctions are circular waveguides (waveguide modes being labeled accordingly). The first matching part may be a first metallic cylinder arranged on the back wall of the first turnstile junction, and the second matching part may be a second metallic cylinder having a smaller diameter than the first metallic cylinder and being arranged on top of the first metallic cylinder.

A standard turnstile junction has poor matching to the TM01 mode. Thus, using a standard design of a turnstile junction based on fundamental-mode-optimization-only as known in the prior art would result in very strong TM01 rejection, leading to a poor higher-order mode extraction. In order to reduce the TM01 mode rejection, the present invention proposes the above configuration which differs from a conventional back-to-back turnstile junction configuration with regard to the cross-section aspect ratio of the ports of rectangular waveguides, the diameter variation of the common port of the first turnstile junction, the variation in the cross-sectional area of the intermediate sections of rectangular waveguide and the particular configuration of the matching sections.

Another aspect of the invention relates to an antenna assembly comprising a user-link feed chain, an antenna horn and the inventive mode extractor. In this antenna assembly, the mode extractor may be arranged between the user-link feed chain and the antenna horn along a signal path.

As described above, the inventive higher-order mode extractor has the property that it acts as a through for the fundamental modes of the electromagnetic signal and can thus be used in between the antenna horn and the user-link feed chain without requiring a dedicated design of the user-link feed chain.

BRIEF DESCRIPTION OF THE FIGURES

The invention is described below in an exemplary manner making reference to the accompanying drawings, of which

DETAILED DESCRIPTION OF THE INVENTION

Preferred embodiments of the present invention will be described in the following with reference to the accompanying figures, wherein in the figures identical objects are indicated by identical reference numbers. It is understood that the present invention shall not be limited to the described embodiments, and that the described features and aspects of the embodiments may be modified or combined to form further embodiments of the present invention.

Figure 4:
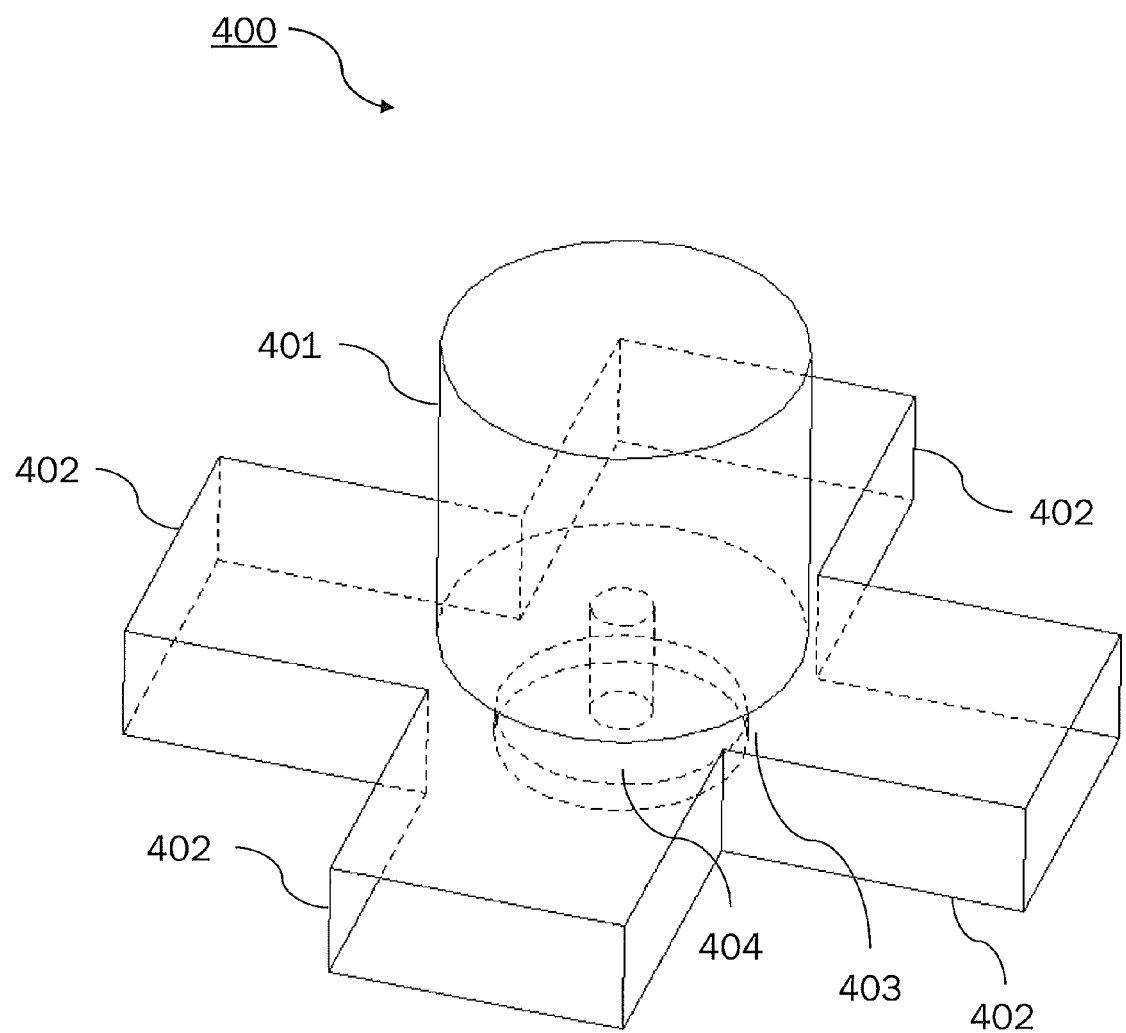
FIG. 4 is a perspective view of a conventional turnstile junction.

As will be described in more detail below, the mode extractor according to the present invention comprises two back-to-back turnstile junctions, i.e. two turnstile junctions which are arranged back to back. A conventional waveguide turnstile junction 400, or rather an RF-path thereof, is schematically illustrated in FIG. 4. It is understood that the RF-path of the turnstile junction 400 is bounded by metallic walls.

The turnstile junction 400 is composed of a common port 401 (first port), which is a waveguide having either circular or square cross-section, so as to support the two orthogonal fundamental modes and thus support dual-linear or dual-circular polarization operation. Here and in the following, unless indicated otherwise, the term "cross-section" of a waveguide is understood to relate to the transverse cross-section, i.e. the cross-section perpendicular to the guide direction of the waveguide. The turnstile junction 400 further comprises four rectangular waveguides 402 (four ports of rectangular waveguide, or second ports) which are arranged symmetrically about a longitudinal axis of the common port and each of which is orthogonal to the longitudinal axis of the common port 401. In other words, the four ports of rectangular waveguide 402 are coplanar and arranged in a crosswise configuration, i.e. each port of rectangular waveguide 402 is orthogonal to its two adjacent ports of rectangular waveguide 402.

The conventional turnstile junction 400 further comprises a matching section 404 for matching impedances of the common port 401 and the four ports of rectangular waveguide 402. The matching section 404 is arranged at least partially inside a center region 403 of the turnstile junction 400, wherein the center region is understood to be located at an intersection of the common port 401 and the four ports of rectangular waveguide 402. In other words, the center region 403 is a region in the RF-path of the conventional turnstile junction 400 that looks into each of the common port 401 and the four ports of rectangular waveguide 402. In more detail, the matching section 404 is provided on a back wall of the turnstile junction 400. Therein, the back wall of the turnstile junction 400 is a wall bounding the RF-path of the turnstile junction 400, which is oriented orthogonal to the longitudinal axis of the common port 401 and located at a far side from the common port 401. In other words, the back wall bounds the four ports of rectangular waveguide 402 and the center region of the turnstile junction 400 to a side located away from the common port 401. In FIG. 4, the back wall is located at the bottom of the turnstile junction 400. The matching section 404 is arranged to be symmetric about the longitudinal axis of the common port 401, and may extend into the common port 401. The matching section 404 may consist of (metallic) cuboids, cylinders, cones, pyramids, frustums (of cones or pyramids) or any combination thereof.

An example of turnstile junction using a combination of two cylinders as a matching section is described in M. A. Meyer and H. B. Goldberg, "Applications of the turnstile junction", IRE Transactions on Microwave Theory and Techniques, Vol. 3, No. 6, pp. 40-45, 1955. A combination of two back-to-back turnstile junctions was described in R. Garcia et al., "Circular polarization feed with dual-frequency OMT-based turnstile junction", IEEE Antennas and Propagation Magazine, Vol. 53, No. 1, pp. 226-236, February 2011. This combination of back-to-back turnstile junctions is optimized to operate with the two orthogonal fundamental modes ($TE_{11}$), and one of the two turnstile junctions is used as an OMJ in combination with filters implemented along the waveguides connecting the rectangular ports of the two turnstile junctions so as to separate transmit and receive user-link signals.

Figure 5:
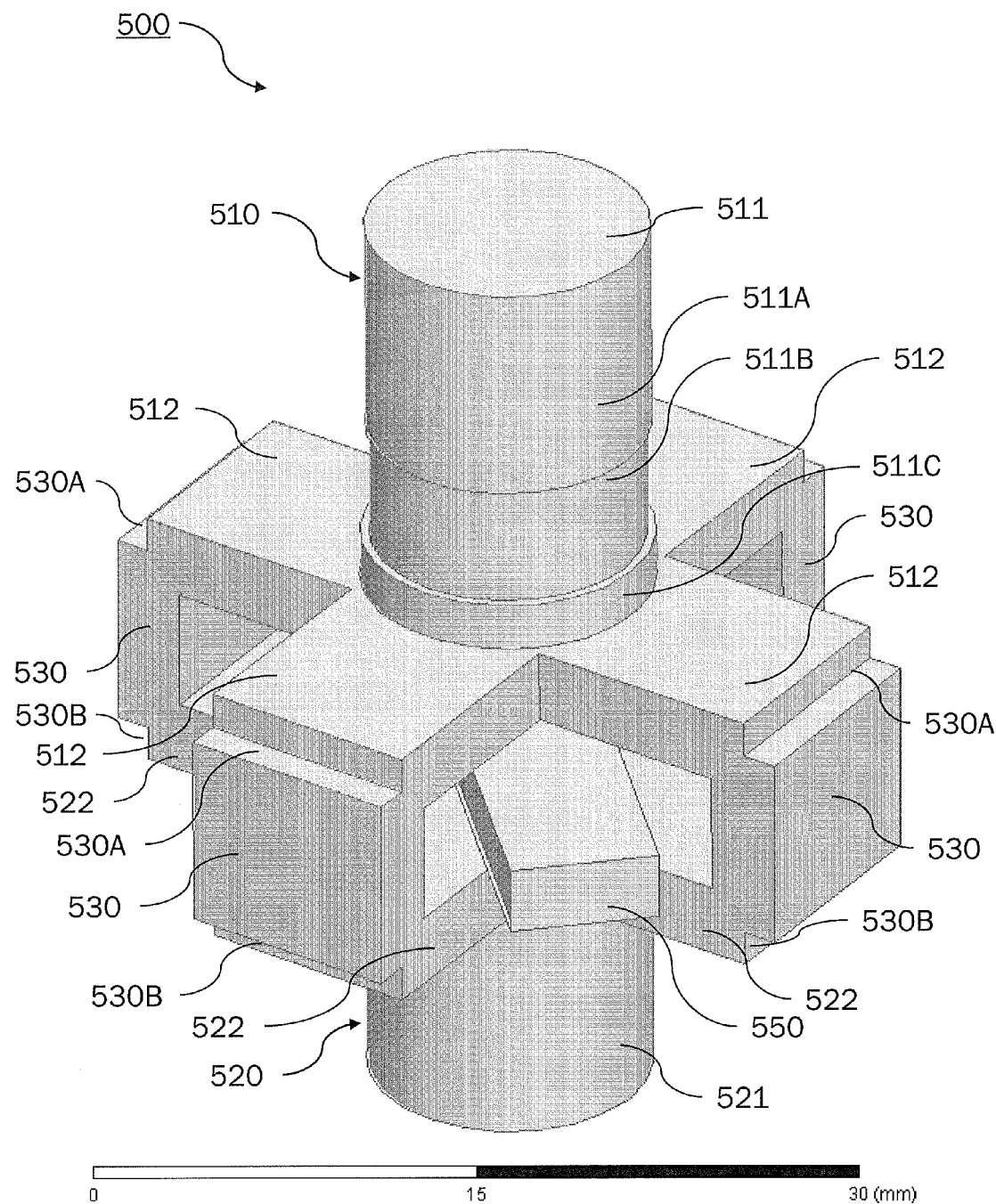
FIG. 5 is a perspective RF-path view of the mode extractor according to the present invention.
Figure 6:
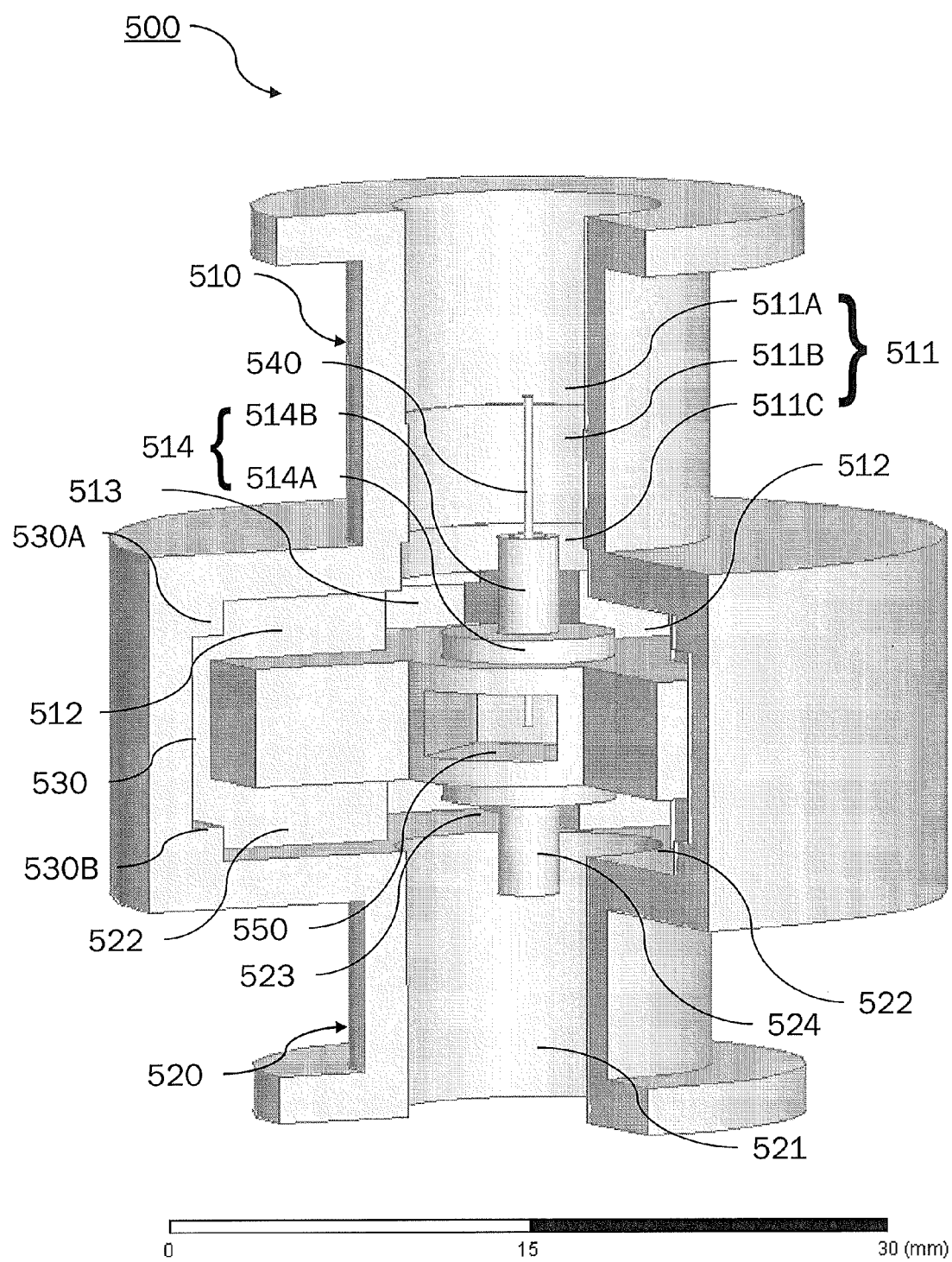
FIG. 6 is a perspective mechanical view of the mode extractor according to the present invention.
Figure 7:
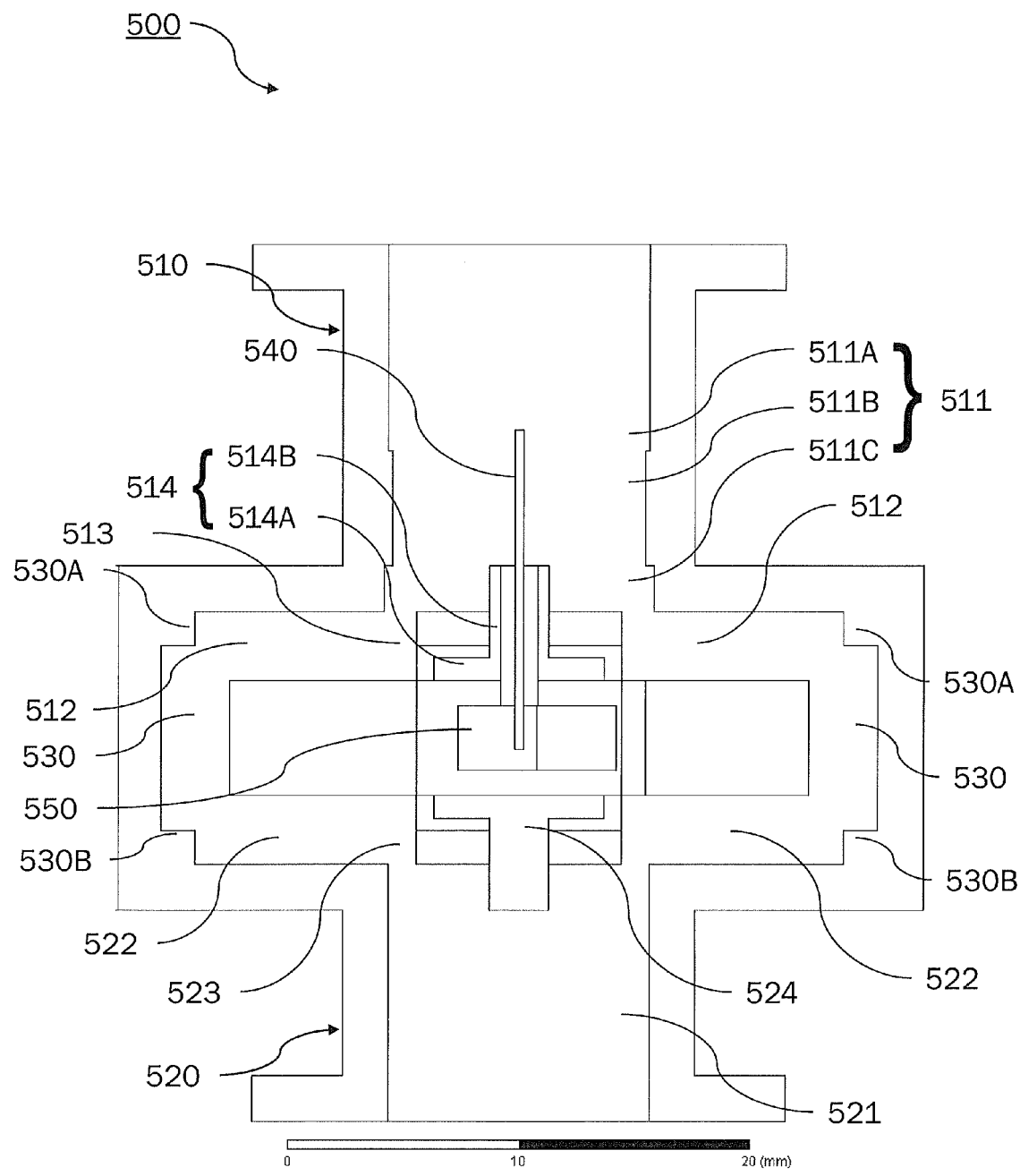
FIG. 7 is a longitudinal cut through the mode extractor according to the present invention.
Figure 8:
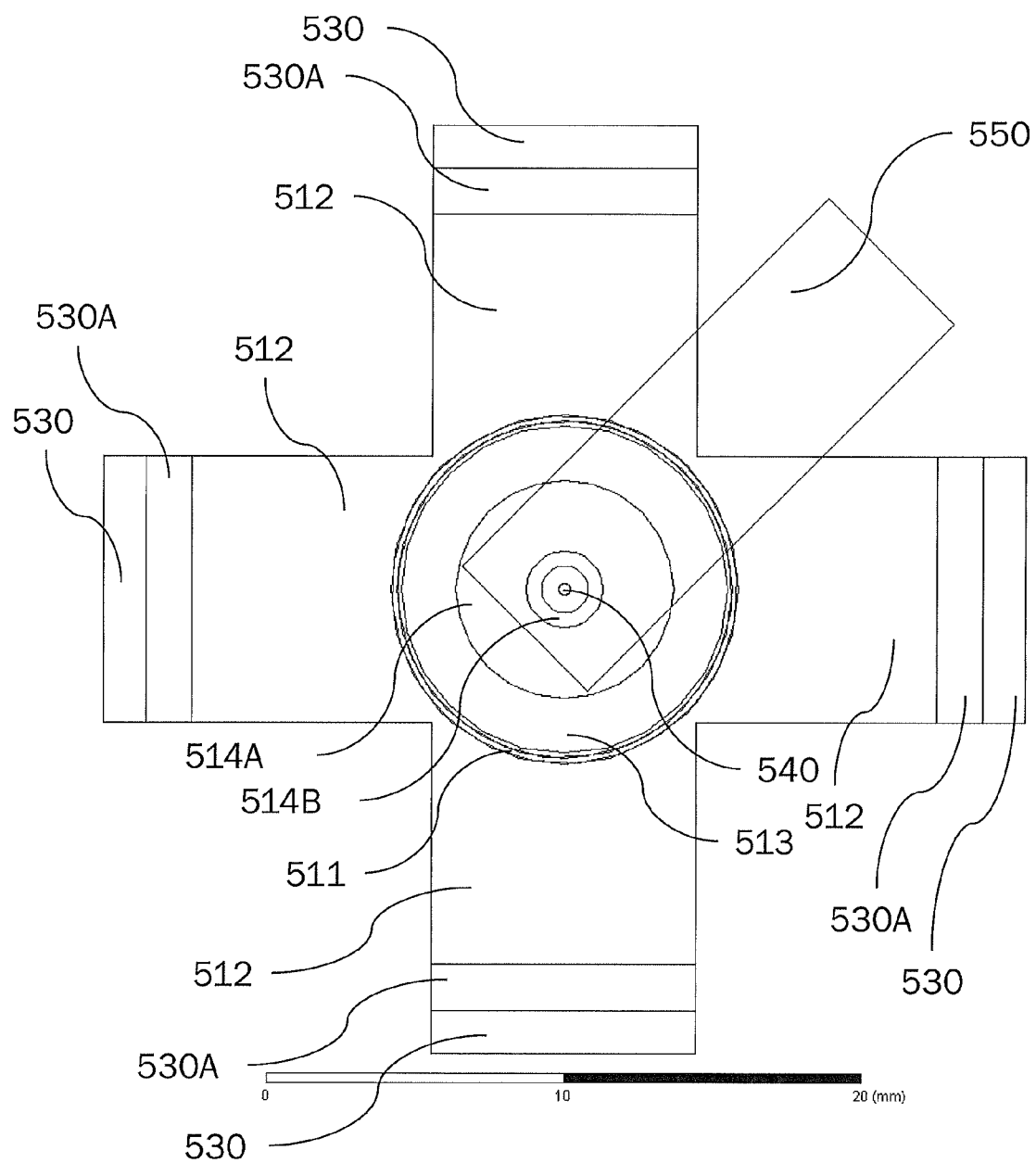
FIG. 8 is a cross-sectional cut through the mode extractor according to the present invention.

A mode extractor 500 according to the present invention for extracting a TM01 mode from an (incoming) electromagnetic signal will now be described with reference to FIG. 5 to FIG. 8. FIG. 5 is an RF-path view of the mode extractor 500, and FIG. 6 is a quarter cut of a mechanical view of the mode extractor 500 showing the actual physical (metallic) walls of the RF-path in FIG. 5. That is, if properly oriented, the view of FIG. 5 is a negative of the view of FIG. 6. FIG. 7 is a sagittal cut through the mode extractor 500, i.e. a cut along a plane spanned by a longitudinal axis (symmetry axis) of one of four ports of rectangular waveguide of a first turnstile junction of the mode extractor 500 and a longitudinal axis of a common port of the first turnstile junction, and FIG. 8 is a top view of the RF-path of the mode extractor 500 along a line of sight extending in parallel to a longitudinal axis of the mode extractor 500, i.e. along a line of sight extending in parallel to the longitudinal axis of the common port of the first turnstile junction. In FIGS. 7 and 8, some hidden lines and surfaces are shown.

The mode extractor 500 illustrated in FIG. 5 to FIG. 8 comprises a first turnstile junction 510 and a second turnstile junction 520, each of which corresponds to the configuration described above with reference to FIG. 4 unless indicated otherwise. The first turnstile junction 510 comprises a common port 511 (first port) and four identical ports of rectangular waveguide 512 (second ports). The four ports of rectangular waveguide 512 are orthogonal to and symmetric about a longitudinal axis of the common port 511. Thus, the four ports of rectangular waveguide 512 are coplanar and further arranged in a crosswise configuration, i.e. each port of rectangular waveguide 512 is orthogonal to its two adjacent ports of rectangular waveguide 512. Here, the longitudinal axis of the common port 511 extends along the guide direction of the common port 511 and intersects a transverse cross-section of the common port 511 in its center. In other words, the longitudinal axis of the common port 511 corresponds to a symmetry axis of the common port 511.

The second turnstile junction 520 comprises a common port 521 (first port) and four identical ports of rectangular waveguide 522 (second ports). The four ports of rectangular waveguide 522 are orthogonal to and symmetric about a longitudinal axis of the common port 521. Thus, the four ports of rectangular waveguide 522 are coplanar and further arranged in a crosswise configuration, i.e. each port of rectangular waveguide 522 is orthogonal to its two adjacent ports of rectangular waveguide 522. Here, the longitudinal axis of the common port 521 extends along the guide direction of the common port 521 and intersects a transverse cross-section of the common port 521 in its center. In other words, the longitudinal axis of the common port 521 corresponds to a symmetry axis of the common port 521.

The first and second turnstile junctions 510, 520 are arranged in a back-to-back configuration, so that the longitudinal axes of their common ports 511, 521 are aligned and so that their common ports 511, 521 are facing away from each other. Thus, a back wall of the first turnstile junction 510 faces a back wall of the second turnstile junction 520, wherein the back walls are perpendicular to the longitudinal axes of the respective common ports 511, 521, and are located at a distal end of the respective turnstile junction 510, 520 when seen from the respective common port 511, 521. Further, the first and second turnstile junctions 510, 520 are arranged so that the ports of rectangular waveguide 512 of the first turnstile junction 510 are in a parallel relationship to the ports of rectangular waveguide 522 of the second turnstile junction 520, i.e. each of the ports of rectangular waveguide 512 of the first turnstile junction 510 has its guide direction extending in parallel to the guide direction of a corresponding one of the ports of rectangular waveguide 522 of the second turnstile junction 520.

According to the inventive configuration, the two turnstile junctions 510, 520 are connected via simple rectangular waveguides 530 (intermediate sections of rectangular waveguide), since both transmit and receive signals need to propagate from one turnstile junction's common port to the other turnstile junction's common port. The intermediate sections of rectangular waveguide 530 extend with their guide directions in parallel to the guide direction of the common port 511 of the first turnstile junction 510.

Next, a number of definitions that will be used in the further description of the invention are provided. Each rectangular waveguide is said to have two broad walls, which are the lateral walls of the respective rectangular waveguide corresponding to broad (i.e. longer) dimensions of the transverse cross-section of the respective rectangular waveguide, and two narrow walls, which are the lateral walls of the respective rectangular waveguide corresponding to narrow (i.e. shorter) dimensions of the transverse cross-section of the respective rectangular waveguide. Therein, lateral walls extend along the guide direction of the respective rectangular waveguide, and the transverse cross-section is the cross-section of the respective rectangular waveguide perpendicular to its guide direction. In the following, the transverse cross-section will be referred to simply as the cross-section.

Inward-facing broad walls of the four ports of rectangular waveguide 512, 522 of the first and second turnstile junctions 510, 520 are those broad walls forming part of the respective end walls of the first and second turnstile junctions 510, 520, i.e. those broad walls closer to a transverse center plane of the mode extractor 500, the transverse center plane extending in perpendicular to the guide directions of the common ports 511, 521 of the first and second turnstile junctions 510, 520 and between the back walls of the first and second turnstile junctions 510, 520. An outward-facing broad wall of each of ports of rectangular waveguide 512, 522 of the first and second turnstile junctions 510, 520 is the broad wall opposed to the respective inward-facing broad wall, i.e. the remaining broad wall of the respective port of rectangular waveguide 512, 522. Outward-facing broad walls of the intermediate sections of rectangular waveguide 530 are those broad walls more distant from a center axis (longitudinal symmetry axis) of the mode extractor 500.

In FIG. 5, the outward-facing broad walls of the four ports of rectangular waveguide 512 of the first turnstile junction 510 are the upper walls of the four ports of rectangular waveguide 512, and the outward-facing broad walls of the four ports of rectangular waveguide 522 of the second turnstile junction 520 are the lower walls of the four ports of rectangular waveguide 522. The inward-facing broad walls of the four ports of rectangular waveguide 512 of the first turnstile junction 510 are the lower walls of the four ports of rectangular waveguide 512, and the inward-facing broad walls of the four ports of rectangular waveguide 522 of the second turnstile junction 520 are the upper walls of the four ports of rectangular waveguide 522. Further, the outward-facing broad walls of the intermediate sections of rectangular waveguide 530 are those that are visible when viewing the mode extractor 500 from its respective sides.

In a center region 513 of the first turnstile junction 510, a metallic matching section 514 is provided. Making reference to the above description of the conventional turnstile junction 400, the center region 513 of the first turnstile junction 510 is located at an intersection of the common port 511 and the four ports of rectangular waveguide 512 of the first turnstile junction 510. To be more precise, the center region 513 is located at an intersection of an extension of the common port 511 and extensions of the four ports of rectangular waveguide 512 of the first turnstile junction 510. Thus, the center region 513 is a region in the RF-path of the first turnstile junction 510 that looks into each of the common port 511 and the four ports of rectangular waveguide 512.

In more detail, the matching section 514 is provided on the back wall of the first turnstile junction 510. The matching section 514 is arranged so as to be symmetric about the longitudinal axis of the common port 511 of the first turnstile junction 510, and may extend into the common port 511. The matching section 514 may consist of (metallic) cuboids, cylinders, cones, pyramids, frustums (of cones or pyramids) or any combination thereof.

In an embodiment of the invention, the common port 511 of the first turnstile junction 510 is a circular waveguide, and the matching section 514 consists of one or more concentric metallic cylinders (matching parts). A first one of the cylinders is arranged on the back wall of the first turnstile junction 510 so as to extend into the center region 513 of the first turnstile junction 510, and any further metallic cylinders (matching parts) have a smaller diameter than the first cylinder and decreasing diameters from one another, and are arranged on top of the first cylinder or on top of respective further cylinders arranged on top of the first cylinder, in the order of their decreasing diameters.

In a preferred embodiment of the invention, the common port 511 of the first turnstile junction 510 is a circular waveguide, and the matching section 514 consists of two concentric metallic cylinders 514A, 514B, wherein the first cylinder 514A (first matching part) is arranged on the back wall of the first turnstile junction 510 so as to extend into the center region 513 of the first turnstile junction 510, and the second cylinder 514B (second matching part) has a smaller diameter than the first cylinder 514A and is arranged on top of the first cylinder 514A.

Likewise, in a center region 523 of the second turnstile junction 520, a metallic matching section 524 is provided. The matching section 524 is provided on the back wall of the second turnstile junction 520. Further, the matching section 524 is arranged so as to be symmetric about the longitudinal axis of the common port 521 of the second turnstile junction 520, and may extend into the common port 521. The matching section 524 may consist of (metallic) cuboids, cylinders, cones, pyramids, frustums (of cones or pyramids) or any combination thereof.

In the preferred embodiment of the invention, the common port 521 of the second turnstile junction 520 is a circular waveguide, and the matching section 524 consists of two concentric metallic cylinders 524A, 524B, wherein the first cylinder 524A is arranged on the back wall of the second turnstile junction 520 so as to extend into the center region 523 of the second turnstile junction 520, and the second cylinder 524B has a smaller diameter than the first cylinder 524A and is arranged on top of the first cylinder 524A.

In the preferred embodiment of the invention, the matching sections 514 and 524 are identical to reduce the complexity of the design, but to further enhance the RF performance, they may be different in shape and dimensions.

In an alternative embodiment, the common port 511 of thefirst turnstile junction 510 is a square waveguide and the matching section 514 consists of cuboids (right prisms) of square cross-section, a first one of which is arranged on the back wall of the first turnstile junction 510 so as to extend into the center region 513 of the first turnstile junction 510, and the further cuboids having decreasing cross-sections from one cuboid to another, and being arranged, with their center axes aligned, on top of the first cuboid or respective ones of the further cuboids in order of decreasing size of their cross-sections.

Likewise, in the alternative embodiment, the common port 521 of the second turnstile junction 520 is a square waveguide, and the matching section 524 of the second turnstile junction 520 in the alternative embodiment is constructed and arranged in accordance with the matching section 514 of the first turnstile junction 510.

In the following, for reasons of conciseness, reference will be made to the first and second cylinders 514A, 514B, 524A, 524B instead of listing each possible geometric configuration of the matching parts. It is however understood that the following description of the present invention likewise relates to generic matching parts, such as cuboids, cylinders, cones, pyramids, frustums (of cones or pyramids) or any combination thereof.

The first turnstile junction 510 is used as a mode extractor having a coaxial coupling device 540 inserted into the matching section 514. The coaxial coupling device 540 is a coaxial line embedded in the matching section 514 with a coupling stub or pin coming out of the coaxial line and extending into the common port 511 of the first turnstile junction 510. The coaxial line may be connected to a coaxial cable or may be used to excite a rectangular waveguide 550 embedded between the back walls of the first and second turnstile junctions 510, 520. The coaxial cable or rectangular waveguide 550 is connected to an RFS port. The top view of FIG. 8 illustrates the case of the coaxial line being connected to the rectangular waveguide 550 and shows how the rectangular waveguide 550 that is embedded between the back walls of the first and second turnstile junctions 510, 520 projects out of the mode extractor 500.

The coaxial coupling device 540 is inserted into the matching section 514 of the first turnstile junction 510 through the back wall of the first turnstile junction 510 and extends along the center axis (symmetry axis) of the matching section 514, i.e. along the center axes (symmetry axes) of the first and second cylinders 514A, 514B (first and second matching parts), and also along the center axis (symmetry axis) of the common port 511 of the first turnstile junction 510. A portion of the coaxial coupling device 540 (i.e, the coupling stub or pin) extends into the common port 511 of the first turnstile junction 510. To this end, the first and second cylinders 514A, 514B are designed as hollow cylinders, or as cylinders having a through hole along their center axes. In general, it can be said that the first and second matching parts are hollow or have a through hole along their center axes, or that the matching section 514 is hollow or has a through hole along its center axis, respectively.

The coaxial coupling device 540 allows to extract the radially symmetric TM01 mode from an incoming electromagnetic signal that is collected by the mode extractor 500 without significantly affecting the fundamental modes of the electromagnetic signal (corresponding to the user-link signals).

Cross-section changes in the common port 511 of the first turnstile junction 510 may be used around the portion of the coaxial coupling device 540 which extends into the common port 511 of the first turnstile junction 510 in order to improve the TM01 mode coupling to the coaxial coupling device 540. As can be seen from FIGS. 5 to 7, the common port 511 of the first turnstile junction 510 has a first portion 511A, a second portion (constricted portion) 511B and a third portion (dilated portion) 511C, which are arranged in this order and adjacent to each other along the guide direction of the common port 511 of the first turnstile junction 510, from a distal part of the common port 511 towards a part of the common port 511 meeting with the four ports of rectangular waveguide 512. In the preferred embodiment, each of the first to third portions 511A, 511B, 511C has the shape of a cylinder in the RF-path view. However, in the alternative embodiment, the first to third portions 511A, 511B, 511C have the shape of a square cross-section in the RF-path view.

An end portion of the third portion (dilated portion) 511C is located at a position at which the common port 511 intersects with the four ports of rectangular waveguide 512. The third portion 511C surrounds a portion of the matching section 514, or to be more precise, a portion of the second cylinder 514B. The second portion (constricted portion) 511B is located adjacent to the third portion 511C (i.e. more distant from the position at which the common port 511 intersects with the four ports of rectangular waveguide 512, or more distant from the center region of the first turnstile junction 510), and surrounds the portion of the coaxial coupling device 540 which extends into the common port 511 of the first turnstile junction 510. The first portion 511A is located adjacent to the second portion 511B, farthest away from the position at which the common port 511 intersects with the four ports of rectangular waveguide 512.

In the above, it is understood that the statement that the third portion 511C surrounds a portion of the matching section 514, or to be more precise, a portion of the second cylinder 514B, relates to both a case in which said portion of the matching section 514 extends into the third portion 511C or through the third portion 511C. It is further understood that the statement that the second portion 511B surrounds the portion of the coaxial coupling device 540 which extends into the common port 511 of the first turnstile junction 510 relates to both a case in which said portion of the coaxial coupling device 540 extends into the second portion 511B or through the second portion 511B. Thus, said statement is understood to also relate to a case in which said portion of the coaxial coupling device 540 extends through the second portion 511B and further into the first portion 511A. This case is illustrated in FIG. 6 and FIG. 7. As can be seen in these figures, said portion of the coaxial coupling device 540 extends, in this order, through the first cylinder 514A, through the second cylinder 514B, through the second portion 511B and into the first portion 511A of the common port 511 of the first turnstile junction 510.

The second portion 511B has a cross-section that is smaller than a cross-section of the common port 521 of the second turnstile junction 520, i.e. the diameter of the second portion 511B is smaller than the diameter of the common port 521 of the second turnstile junction 520. In other words, the second portion 511B is a constricted portion (i.e. a portion of reduced cross-section compared to the common port 521 of the second turnstile junction 520). The third portion 511C has a cross-section that is larger than the cross-section of the common port 521 of the second turnstile junction 520, i.e. the diameter of the third portion 511C is larger than the diameter of the common port 521 of the second turnstile junction 520. In other words, the third portion 511C is a dilated portion or a widened portion (i.e. a portion of increased cross-section compared to the common port 521 of the second turnstile junction 520). The first portion 511A has a cross-section that is equal to the cross-section of the common port 521 of the second turnstile junction 520, i.e. the diameter of the first portion 511A is equal to the diameter of the common port 521 of the second turnstile junction 520.

By this choice of cross-sections of the first to third portions 511A, 511B, 511C of the common port 511 of the first turnstile junction 510, the coupling of the TM01 mode to the coaxial coupling device 540 and the matching of the fundamental modes TE11 are improved.

To further improve TM01 mode extraction, a key design parameter is the dimension of the small-wall in the cross-section of the rectangular waveguides of the four ports of rectangular waveguide 512. Here, the small-wall, or narrow wall, is the wall of the rectangular waveguide corresponding to shorter ones (narrow ones) of the sides of the (transverse)

cross-section of the rectangular waveguide, wherein the transverse cross-section, or simply cross-section for short, is the section through the rectangular waveguide perpendicular to its guide direction. As the present inventor has realized, reduction of the dimension of the small-wall in the cross-section of the rectangular waveguides results in a significant increase in the coupling of the TM01 mode to the coaxial coupling device 540.

Since a reduction of the dimension of the small-walls also tends to degrade the throughput of the fundamental modes, a trade-off has to be found between TM01 mode extraction and propagation of the fundamental modes through the mode extractor 500. In the inventive mode extractor 500, a cross-section aspect ratio of the rectangular waveguides of the ports of rectangular waveguide 512, 522 of the first and second turnstile junctions 510, 520, respectively, is smaller than 1:2, wherein the cross-section aspect ratio indicates the ratio between the dimension of the narrow walls and the dimension of the broad walls of the rectangular waveguide. In other words, the cross-section aspect ratio is the height-to-width ratio of the cross-section of the rectangular waveguide.

A good starting point for optimization is an aspect ratio of 1:4 for the cross-section of the rectangular waveguides. Thus, in a preferred embodiment, the mode extractor 500 has an aspect ratio of the cross-section of the rectangular waveguides of the ports of rectangular waveguide 512, 522 of the first and second turnstile junction 510, 520, respectively, between (1:4−x/2) and (1:4+x/2), with x≤0.4. Further preferably, the cross-section aspect ratio is between (1:4−x/2) and (1:4+x/2), with x≤0.2. Yet further preferably, the cross-section aspect ratio is between (1:4−x/2) and (1:4+x/2), with x≤0.1.

Figure 11A:
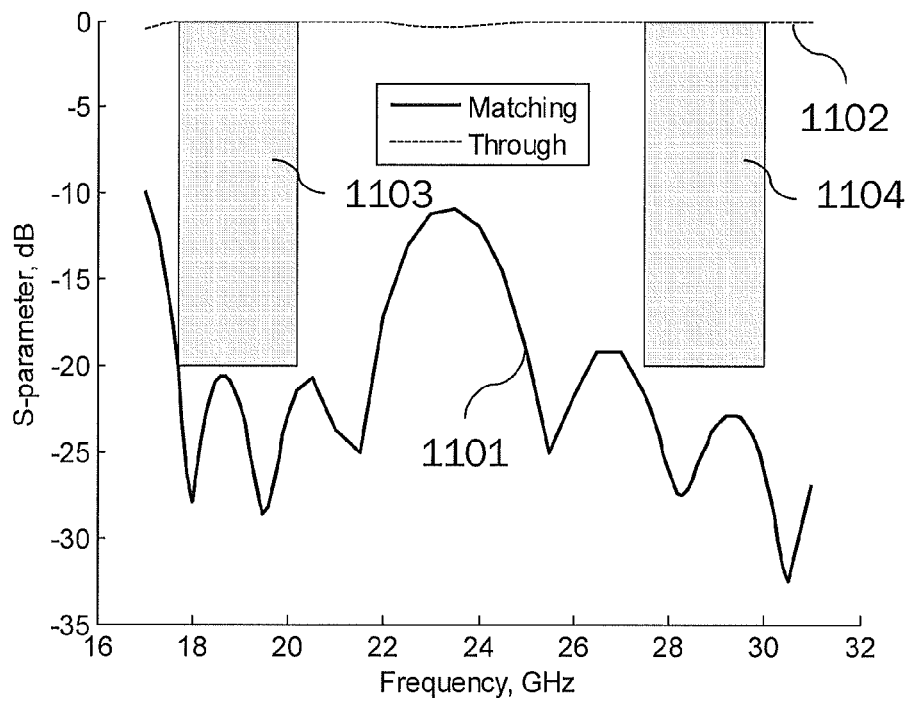
FIGS. 11A and 11B illustrate an electrical performance of a modification of the mode extractor according to the present invention.

Additional grooves, corrugations, irises or any other well-known features typically used by the expert in the field to improve return losses may be implemented in the common ports 511, 521 of the first and second turnstile junctions 510, 520 and/or in the intermediate sections of rectangular waveguide 530 connecting the two back-to-back turnstile junctions 510, 520 so as to improve the overall RF performance of the mode extractor 500. Such features may also be added in the coaxial coupling device 540 or to the rectangular waveguide 550 embedded between the back walls of the first and second turnstile junctions 510, 520 so as to improve return losses of the RFS port and to provide a generic mode extractor design covering the full receive band with excellent RF performance. As an example, the impact of such modifications will be discussed below with reference to FIGS. 11A and 11B.

As can be seen in FIGS. 5 to 9, each of the intermediate sections of rectangular waveguide 530 has a first step portion 530A at its one end and a second step portion 530B at its other end. The first step portion 530A is provided at the broad wall of each intermediate section 530 that faces outwards (i.e. the broad wall of the respective intermediate section 530 most remote from the center axis of the mode extractor 500) at a position at which the respective intermediate section 530 meets with a corresponding one of the four port of rectangular waveguide 511 of the first turnstile junction 510. Thus, the first step portion 530A is provided at the meeting edge of the outward-facing broad wall of the intermediate section 530, and the outward-facing broad wall of the corresponding one of the four ports of rectangular waveguide 512 of the first turnstile junction 510, wherein the outward-facing broad wall of the corresponding one of the four ports of rectangular waveguide 512 is the broad wall most remote from a center transverse plane of the mode extractor 500.

The second step portion 530B is provided at the outward-facing broad wall of each intermediate section 530 at a position at which the respective intermediate section 530 meets with a corresponding one of the four port of rectangular waveguide 522 of the second turnstile junction 520. Thus, the second step portion 530B is provided at the meeting edge of the outward-facing broad wall of the intermediate section 530, and the outward-facing broad wall of the corresponding one of the four ports of rectangular waveguide 522 of the second turnstile junction 520, wherein the outward-facing broad wall of the corresponding one of the four ports of rectangular waveguide 522 is the broad wall most remote from a center transverse plane of the mode extractor 500.

Each of the first and second step portions 530A, 530B, which are preferably identical in their dimensions for reasons of symmetry, reduces the area of the cross-section of the respective intermediate section of rectangular waveguide 530. These step portions improve the transfer of the fundamental modes between the two common ports 511, 521. Additional step portions may be implemented to further reduce insertion losses affecting the fundamental modes.

Figure 1:
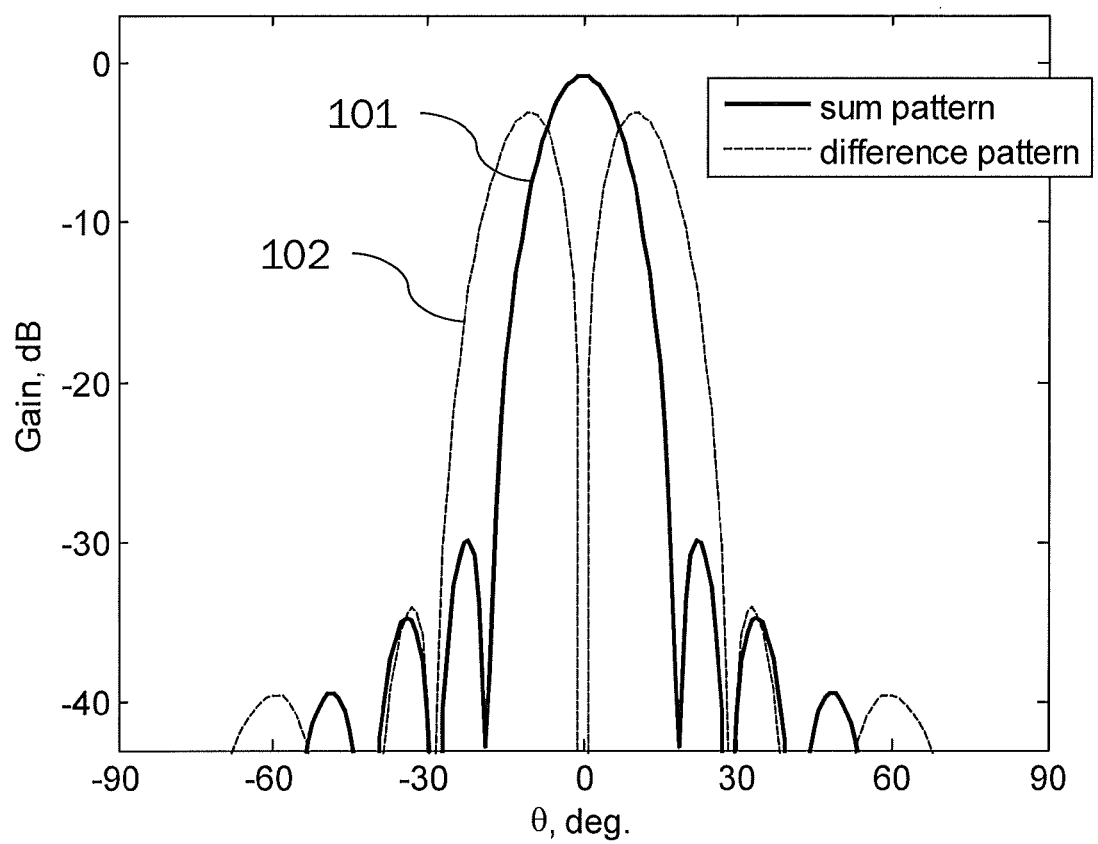
FIG. 1 illustrates a sum pattern and a difference pattern corresponding to a feed chain having user-link and RFS ports.
Figure 2:
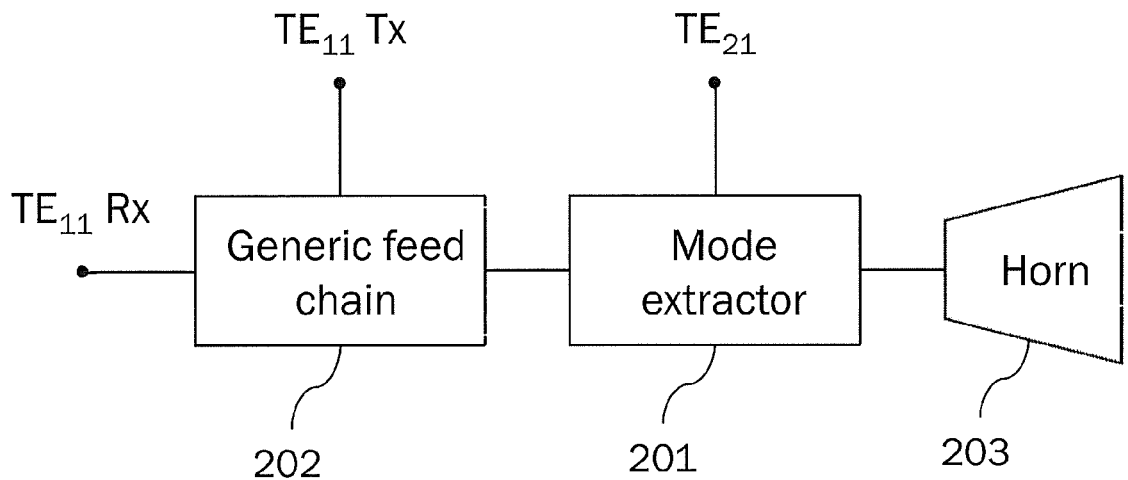
FIG. 2 is a schematic illustration of a first antenna assembly known in the prior art.
Figure 3:
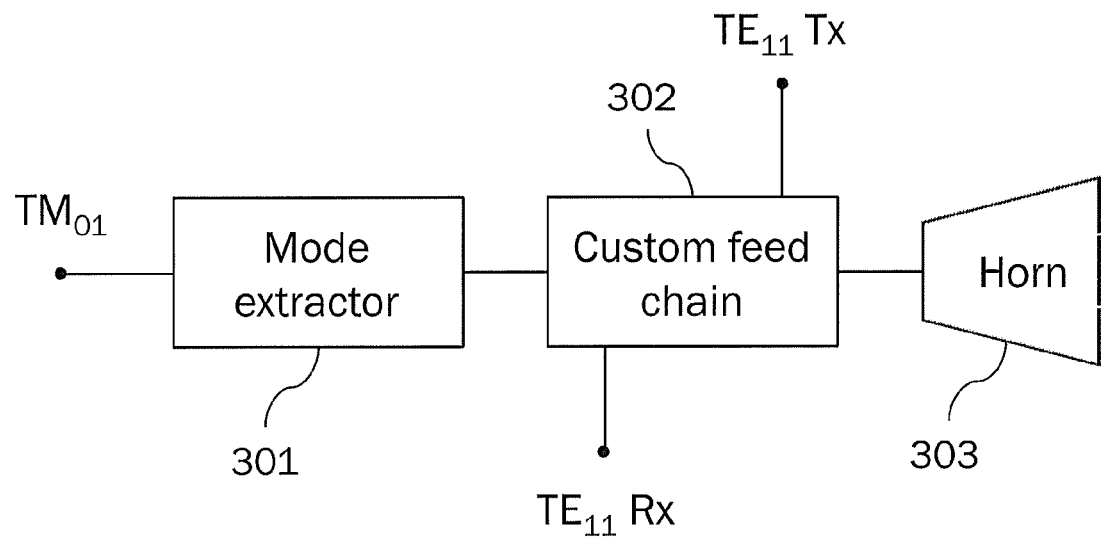
FIG. 3 is a schematic illustration of a second antenna assembly known in the prior art.

In a feed chain assembly using the mode extractor 500, the common port 511 of the first turnstile junction 510 is to be connected to a horn antenna of the feed chain assembly, and the common port 521 of the second turnstile junction 522 is to be connected to a generic user-link feed chain of the feed chain assembly. Thus, the mode extractor 500 is configured for a feed chain assembly as illustrated in FIG. 2, with the difference that according to the present invention the TM01 mode is extracted by the mode extractor 500 instead of the TE21 mode. The resulting feed chain assembly, including the mode extractor 500, may be used in the focal plane of a multiple beam reflector antenna operating in a single-feed-per-beam configuration. The focal plane of this reflector antenna comprises several generic user-link-only feed chains and at least one generic user-link and mode extractor feed chain. The resulting antenna farm for a typical multiple beam communication satellite application comprises typically three or four of these single-feed-per-beam reflector antennas, each having at least one feed chain comprising the mode extractor 500.

Figure 9:
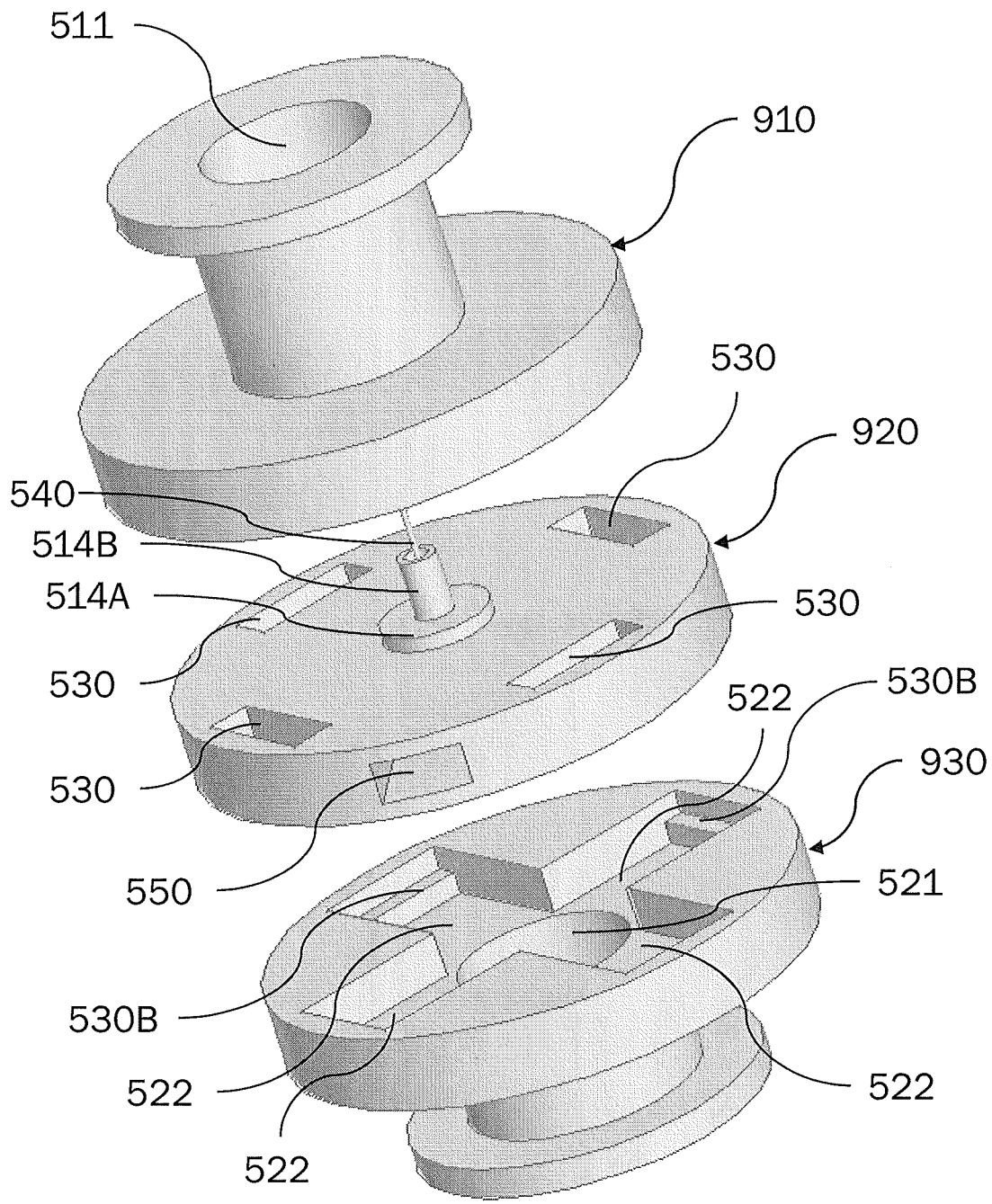
FIG. 9 is a perspective view of mechanical components from which the mode extractor according to the present invention can be assembled.

FIG. 9 illustrates a method for assembly of the inventive mode extractor 500. According to this method, the mode extractor 500 is assembled by joining together a first part 910, a second part 920, and a third part 930, which are all metallic parts except for the coaxial coupling device 540 (coaxial probe) which may use another materials such as dielectric materials so as to hold the pin. The first and third parts 910, 930 are identical, so that in the following only the third part 930 will be described. The third part 930 comprises a disk-like cylindrical first portion to which a cylindrical second portion housing the common port 521 of the second turnstile junction 520 is joined. On a side of the first portion facing away from the second portion a cross-shaped recess is formed that corresponds to the four ports of rectangular waveguide 522 of the second turnstile junction 520. At the end of each arm of the cross-shaped recess, a portion having reduced depth is provided, which corresponds to a respective one of the second step portions 530B of the intermediate sections of rectangular waveguide 530. At a distal end of the second portion of the third part 930, a waveguide flange is provided for connecting the common port 522 of the second turnstile junction 520 to e.g. the user-link feed chain.

The second part 920 has the shape of a disk with four rectangular through-holes provided along the circumference of the disk at equal angular intervals. These through-holes correspond to a middle portion of the intermediate sections of rectangular waveguide 530. On the top and bottom surfaces of the second part 920, corresponding to the inward-facing broad walls of the four ports of rectangular waveguide 512, 522 of the first and second turnstile junctions 510, 520, the matching sections 514, 524 of the first and second turnstile junctions 510, 520 are provided. Between the top and bottom surfaces of the second part 920, a hollow is formed that has the shape of a rectangular cuboid and extends from a lateral cylindrical surface of the second part 920 to slightly beyond the center of the second part 920. This hollow corresponds to the rectangular waveguide 550 embedded between the back walls of the first and second turnstile junctions 510, 520. Further, the coaxial coupling device 540 is inserted into the second part 920 to extend from the hollow corresponding to the rectangular waveguide 550 through the matching section 514 of the first turnstile junction 510, and into the common port 511 of the first turnstile junction 510.

As can be inferred from the scales provided at the bottom of FIGS. 5 to 9, the mode extractor 500 according to the present invention is extremely compact. The RF functional structure tuned to cover the standard Ka-band allocated to satellite communications, i.e. 17.7-20.2 GHz in transmit and 27.5-30.0 GHz in receive, fits in a cylinder of 32 mm in diameter and 23 mm in height. This is about ten times shorter than a standard TE21 mode extractor compatible with a generic user-link feed chain design. The diameter, which is less than two wavelengths at the lowest frequency, is compatible with very compact next-generation user-link feed chain designs. Evidently, such a compact design enables to save both cost and mass.

Next, the electrical performance of the mode extractor 500 according to the present invention as illustrated in FIGS. 5 to 9 will be described. The mode extractor 500 has been analyzed using a full-wave electromagnetic (EM) software based on a Finite Element Method (FEM) to assess the potential of the invention. For this analysis, the design of the mode extractor 500 was tuned to cover the standard Ka-band allocated to satellite communications, i.e. 17.7-20.2 GHz in transmit and 27.5-30.0 GHz in receive. To reduce the number of design parameters, it was decide to use two identical turnstile junctions (identical common port, ports of rectangular waveguide and matching section dimensions), although a more advanced design could benefit from asymmetric designs thus providing additional degrees of freedom in the optimization process. The matching sections 514, 524 of the first and second turnstile junctions 510, 520 each are a combination of conical frustums with the top disk dimension being imposed by the coaxial line diameter. A cross-section change as described above is added to the common port 511 of the first turnstile junction 510 which is to be connected to the horn, so as to improve the extraction of the TM01 mode.

Figure 10A:
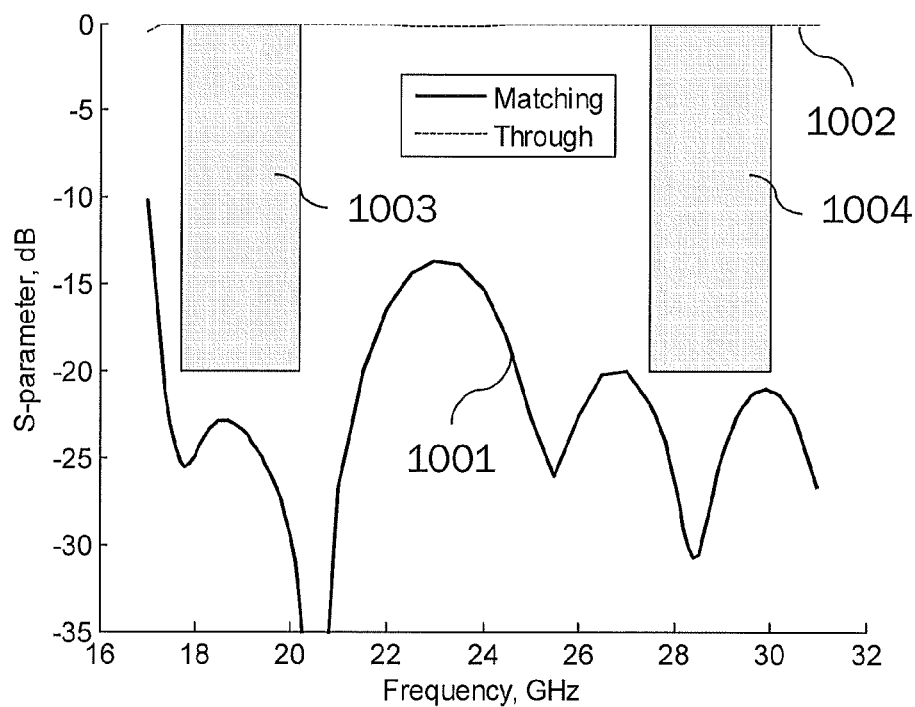
FIGS. 10A and 10B illustrate an electrical performance of the mode extractor according to the present invention.
Figure 10B:
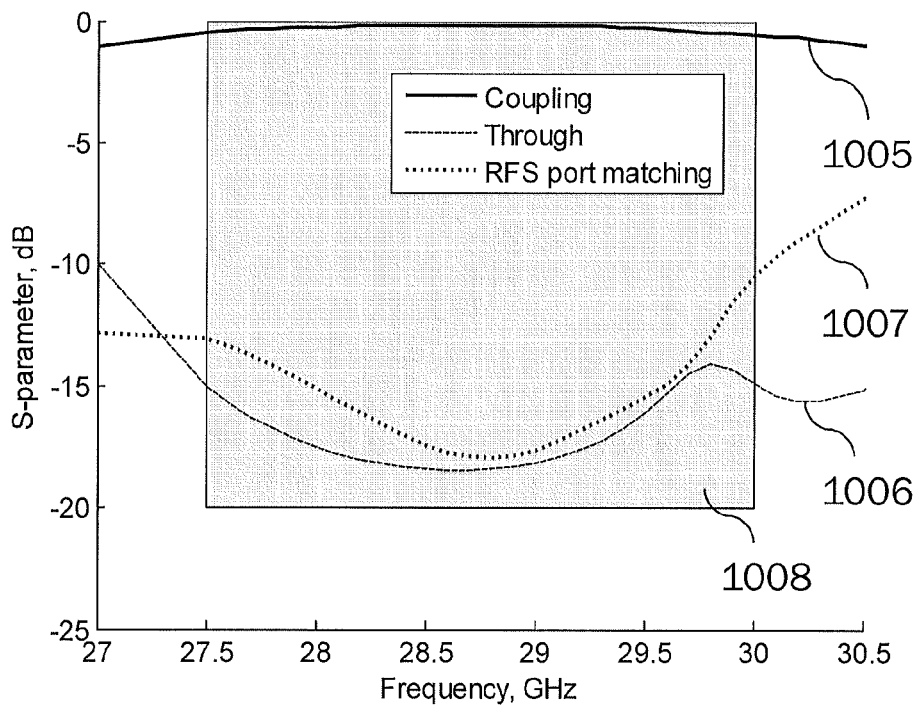

Simulation results for the electrical performance (RF-performance) of this design are reported in FIGS. 10A and 10B, of which FIG. 10A indicates the S-parameter for the fundamental TE11 modes in units of dB as a function of frequency in units of GHz, and FIG. 10B indicates the S-parameter of the TM01 mode in units of dB as a function of frequency in units of GHz. Graph 1001 in FIG. 10A indicates the matching of the input port of the mode extractor 500 to an external port for the fundamental modes (S11-component of the S-parameter for the fundamental modes), and graph 1002 indicates the transmission coefficient between the input port and the output port of the mode extractor 500 for the fundamental modes (S12-component of the S-parameter for the fundamental modes). The grey areas 1003, 1004 in FIG. 10A represent typical transmit band (left grey area 1003) and receive band (right grey area 1004) requirements at Ka-band (matching better than −20 dB over operating bands). Graph 1005 in FIG. 10B indicates the transmission coefficient between the input port and the RFS port of the mode extractor 500 for the TM01 mode (S13-component of the S-parameter for the TM01 mode), graph 1006 indicates the transmission coefficient between the input port and the output port of the mode extractor 500 for the TM01 mode (S12-component of the S-parameter for the TM01 mode), and graph 1007 indicates the matching of the RFS port of the mode extractor 500 to an external port for the TM01 mode (S33-component of the S-parameter for the TM01 mode), wherein the RFS port is indicated by the index 3. The grey area 1008 in FIG. 10B represents the receive band requirement at Ka-band.

As can be seen from graph 1001 in FIG. 10A, matching for the two fundamental TE11 modes is better than −23 dB in the transmit band and −21 dB in the receive band, with insertion losses less than 0.04 dB over the two frequency bands (cf. graph 1002), not taking into account ohmic losses. Overall, the mode extractor 500 demonstrates wideband behavior which provides some margins to manufacturing errors and typical frequency shifts due to in-orbit temperature variations. The very wideband behavior of the mode extractor 500 also indicates that it could successfully be tuned to operate with similar performance over the Ku-band or C-band, which are used in satellite applications and that may also require compact mode extractors in view of the current trend of extending multiple beam operation to these bands as well. As can be seen from graph 1005 in FIG. 10B, the mode extractor 500 provides a coupling factor better than 0.6 dB over the full receive band for the RFS mode, which is acceptable for many applications.

Figure 11B:
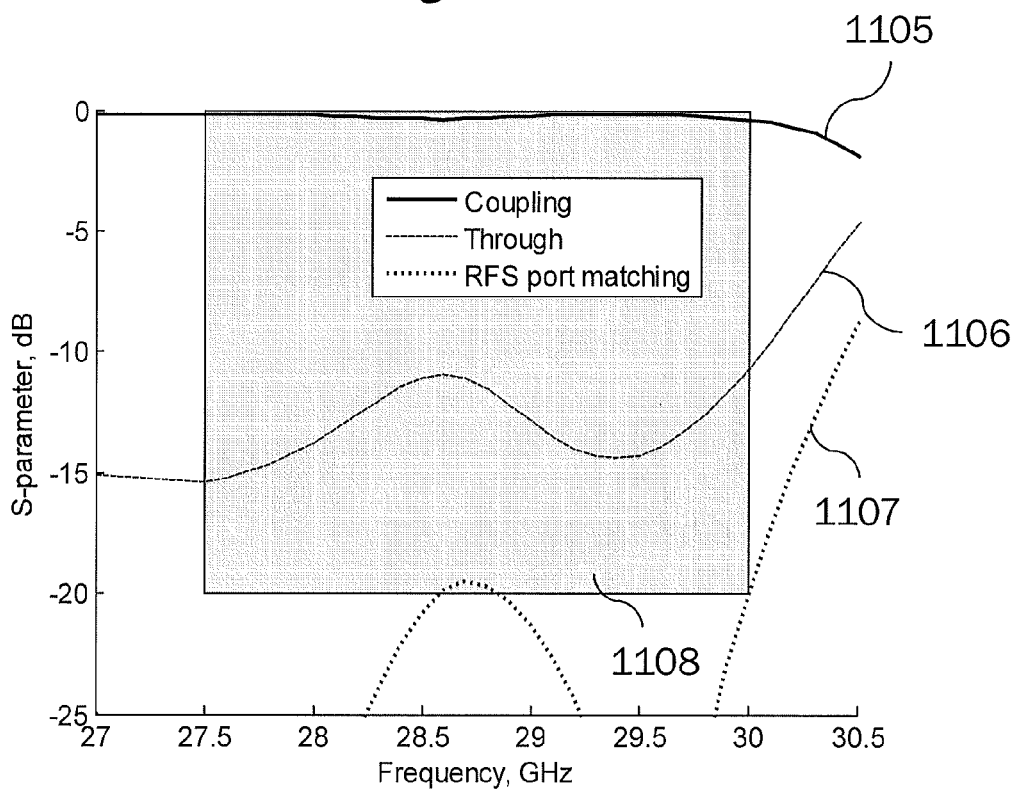

To illustrate possible improvement adding typical matching features to the design, a matching section line (which consists of a change in cross-section radius) was added to the coaxial line, i.e. to the coaxial coupling device 540. The simulation results obtained following an optimization are reported in FIGS. 11A and 11B, of which FIG. 11A indicates the S-parameter for the fundamental modes in units of dB as a function of frequency in units of GHz, and FIG. 11B indicates the S-parameter of the TM01 mode in units of dB as a function of frequency in units of GHz. Graph 1101 in FIG. 11A indicates the S11-component of the S-parameter for the fundamental modes, and graph 1102 indicates the S12-component of the S-parameter for the fundamental modes. In FIG. 11B, graph 1105 indicates the S13-component of the S-parameter for the TM01 mode, graph 1106 indicates the S12-component of the S-parameter for the TM01 mode, and graph 1107 indicates the S33-component of the S-parameter for the TM01 mode. Also here the grey areas 1103, 1104, 1108 represent the transmit band and receive band requirements at Ka-band, respectively.

As can be seen from FIG. 11B, the performance of the RFS port is significantly improved by adding typical matching features. The port matching is better than −19 dB over the full receive band (in FIG. 10B, the worst case over the receive band was −11 dB while the best case was −18 dB). This is connected to an improved coupling factor which is now better than 0.4 dB over the full receive band. On the other hand, the modifications to the design parameters only slightly affect the response to the fundamental modes, so that the matching for the fundamental modes illustrated in FIG. 11A remains better than −20 dB over the transmit and receive bands. This corresponds to insertion losses better than 0.05 dB over said two frequency bands, again not taking into account ohmic losses.

The above analyses confirm that the present invention provides for broadband mode extraction which only minimally affects propagation of the fundamental modes, thus resulting in a generic mode extractor design which also has a positive impact on development costs.

The above description of the invention is based on a standard turnstile junction having four ports of rectangular waveguide (second ports), as this symmetrical arrangement naturally provides better performance in the case of dual-polarization operation. In case only single linear polarization operation is needed, the number of ports of rectangular waveguide could be reduced to two.

In addition, the above description of the invention has been provided in the specific case of a space segment for multiple beam broadband satellite communication applications, but the invention may find application in any field requiring feeds with enhanced pointing capability and stringent constraints in both mass and dimensions. This may include the ground segment for satellite communication applications (ground stations and terminals), test range applications, etc.

Features, components and specific details of the structures of the above-described embodiments may be exchanged or combined to form further embodiments optimized for the respective application. As far as those modifications are readily apparent for an expert skilled in the art, they shall be disclosed implicitly by the above description without specifying explicitly every possible combination, for the sake of conciseness of the present description.

What is claimed is:

1. A mode extractor for extracting a TM01 mode from an electromagnetic signal, comprising a first turnstile junction and a second turnstile junction, each of the turnstile junctions having a first port, four second ports of rectangular waveguide which are mutually orthogonal and orthogonal to the first port, and a matching section provided at least partially in a center region of the respective turnstile junction, the center region being located at an intersection of the first port and the four second ports,
wherein the first turnstile junction and the second turnstile junction are arranged so that longitudinal axes of their first ports are aligned with each other and their first ports are facing in opposite directions,
each of the second ports of the first turnstile junction is electromagnetically coupled to a corresponding one of the second ports of the second turnstile junction, and
a coaxial coupling device is inserted into the matching section of the first turnstile junction so that a portion of the coaxial coupling device extends into the first port of the first turnstile junction.

2. The mode extractor according to claim 1, wherein the rectangular waveguides of the second ports of the first and second turnstile junctions have a cross-section aspect ratio of less than 1:2.

3. The mode extractor according to claim 1, wherein the rectangular waveguides of the second ports of the first and second turnstile junctions have a cross-section aspect ratio between (1:4−x/2) and (1:4+x/2), with x≤0.4.

4. The mode extractor according to claim 1, wherein the second ports of the first turnstile junction are electromagnetically coupled to the corresponding second ports of the second turnstile junction by intermediate sections of rectangular waveguide that extend in parallel to the longitudinal axis of the first port of the first turnstile junction.

5. The mode extractor according to claim 4, wherein each of the intermediate sections of rectangular waveguide has a first step portion at its one end and a second step portion at its other end, the first and second step portions each reducing a respective cross-section of the intermediate section of rectangular waveguide.

6. The mode extractor according to claim 1, wherein the first port of the first turnstile junction has a constricted portion which surrounds the portion of the coaxial coupling device that extends into the first port of the first turnstile junction, and which has a smaller cross-section than the first port of the second turnstile junction.

7. The mode extractor according to claim 6, wherein the first port of the first turnstile junction has a dilated portion which is located between the constricted portion and the center region of the first turnstile junction and which has a larger cross-section than the first port of the second turnstile junction.

8. The mode extractor according to claim 1, wherein
the matching section of the first turnstile junction is symmetric about the longitudinal axis of the first port of the first turnstile junction,
the coaxial coupling device is inserted into the matching section of the first turnstile junction through a back wall of the first turnstile junction, which is located on a far side of the first turnstile junction from the first port of the first turnstile junction, and
the coaxial coupling device extends through the matching section of the first turnstile junction along a center line of the matching section into the first port of the first turnstile junction.

9. The mode extractor according to claim 8, wherein
the matching section of the first turnstile junction comprises one or more matching parts which are concentric to each other, and each of which is a metallic cylinder, cuboid, or frustum,
the one or more matching parts are arranged so as to be symmetric about the longitudinal axis of the first port of the first turnstile junction, and at least one of the one or more matching parts protrudes into the first port of the first turnstile junction, and
the coaxial coupling device extends through the one or more matching parts along their center axes into the first port of the first turnstile junction.

10. The mode extractor according to claim 8, wherein
the matching section of the first turnstile junction comprises first and second matching parts which are concentric to each other, and each of which is a metallic cylinder, cuboid, or frustum,
the first and second matching parts are arranged so as to be symmetric about the longitudinal axis of the first port of the first turnstile junction, and at least one of the first and second matching parts protrudes into the first port of the first turnstile junction, and
the coaxial coupling device extends through the first and second matching parts along their center axes into the first port of the first turnstile junction.

11. The mode extractor according to claim 8, wherein the coaxial coupling device is coupled into a rectangular waveguide or to a coaxial cable arranged between the back wall of the first turnstile junction and a back wall of the second turnstile junction, the back wall of the second turnstile junction being located on a far side of the second turnstile junction from the first port of the second turnstile junction.

12. The mode extractor according to claim 1, wherein the coaxial coupling device is a coupling stub or a pin of a coaxial line.

13. The mode extractor according to claim 1, wherein the first ports of the first and second turnstile junctions are circular waveguides.

14. The mode extractor according to claim 13, wherein the first matching part is a first metallic cylinder arranged on a back wall of the first turnstile junction, and the second matching part is a second metallic cylinder having a smaller diameter than the first metallic cylinder and being arranged on top of the first metallic cylinder.

15. An antenna assembly comprising a user-link feed chain, an antenna horn and the mode extractor according to claim 1.

16. The antenna assembly according to claim 15, wherein the mode extractor is arranged between the user-link feed chain and the antenna horn along a signal path.

\* \* \* \* \*